United States Patent
Lee

(10) Patent No.: US 9,395,484 B2
(45) Date of Patent: Jul. 19, 2016

(54) DISPLAY DEVICE

(71) Applicant: Samsung Display Co., Ltd., Yongin-si, Gyeonggi-Do (KR)

(72) Inventor: Jung-il Lee, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 78 days.

(21) Appl. No.: 14/531,060

(22) Filed: Nov. 3, 2014

(65) Prior Publication Data

US 2015/0355404 A1    Dec. 10, 2015

(30) Foreign Application Priority Data

Jun. 10, 2014    (KR) .................. 10-2014-0069835

(51) Int. Cl.
*F21V 8/00* (2006.01)

(52) U.S. Cl.
CPC ............ *G02B 6/0088* (2013.01); *G02B 6/0035* (2013.01); *G02B 6/0051* (2013.01); *G02B 6/0053* (2013.01)

(58) Field of Classification Search
CPC .. G02B 6/0088; G02B 6/0053; G02B 6/0051; G02B 6/0035; G02B 6/0086; F21V 17/00
See application file for complete search history.

(56) References Cited

U.S. PATENT DOCUMENTS

| | | | | |
|---|---|---|---|---|
| 6,175,396 B1 * | 1/2001 | Kim | ................. | G02F 1/133308 349/58 |
| 6,835,961 B2 * | 12/2004 | Fukayama | ........ | G02F 1/133308 257/84 |
| 6,950,154 B2 * | 9/2005 | Lee | ...................... | G02B 6/0088 349/58 |
| 7,106,393 B2 * | 9/2006 | Lee | ...................... | G02B 6/0088 349/58 |
| 7,125,157 B2 * | 10/2006 | Fu | ..................... | G02F 1/133608 349/58 |
| 8,550,688 B2 * | 10/2013 | Seo | .................. | G02F 1/133604 349/58 |
| 2006/0007367 A1 | 1/2006 | Cho | | |
| 2008/0094535 A1 | 4/2008 | Suh et al. | | |
| 2011/0292316 A1 | 12/2011 | Fujimoto et al. | | |
| 2013/0107170 A1 | 5/2013 | Gee et al. | | |

FOREIGN PATENT DOCUMENTS

| | | |
|---|---|---|
| JP | 2003222865 A | 8/2003 |
| KR | 1020060106334 A | 10/2006 |
| KR | 1020070060445 A | 6/2007 |
| KR | 1020080078273 A | 8/2008 |
| KR | 1020100123530 A | 11/2010 |
| KR | 1020110093292 A | 8/2011 |
| KR | 1020130074550 A | 7/2013 |

* cited by examiner

*Primary Examiner* — Bao Q Truong
(74) *Attorney, Agent, or Firm* — Cantor Colburn LLP

(57) ABSTRACT

A display device includes a light source which generates light, a light guide plate including a first surface receiving the light, and a second surface emitting the light, an optical sheet disposed on the light guide plate and including a sheet body and a sheet guide unit, a mold frame including a guide mold, and a side-surface mold which is extended upwards from the guide mold and in which a recess groove accommodating the sheet guide unit is defined, and a protrusion body including a first end portion inserted in the mold frame, and a second end portion coupled to the sheet guide unit, where an inserting groove in which the protrusion body is inserted is defined in the side-surface mold, and the protrusion body has a smaller width compared to a width of the inserting groove.

19 Claims, 10 Drawing Sheets

DISPLAY DEVICE

This application claims priority to Korean Patent Application No. 10-2014-0069835, filed on Jun. 10, 2014, and all the benefits accruing therefrom under 35 U.S.C. §119, the disclosure of which is incorporated herein in its entirety by reference.

BACKGROUND

1. Field

The invention relates to a display device including an optical sheet designed to reduce defects caused by expansion and contraction of the optical sheet.

2. Description of the Related Art

A liquid crystal display ("LCD") is a type of flat panel display ("FPD"), which is the most widely used type of display devices. The LCD includes two substrates including electrodes formed thereon and a liquid crystal layer interposed therebetween. Upon applying voltage to the electrodes, liquid crystal molecules of the liquid crystal layer are rearranged, thereby adjusting an amount of transmitted light.

The LCD includes an LCD panel configured to display an image and a backlight unit configured to supply light to the display panel. The backlight unit is classified into three types based on position of a light source, that is, a direct type, an edge type, and a corner type.

The direct-type backlight unit generally includes a plurality of light sources disposed under the LCD panel, and thus the LCD panel is irradiated with light emitted from the light source through a diffusion plate. The edge-type backlight unit includes a light guide plate and the light source disposed on one side of the light guide plate, and thus the LCD panel is irradiated with light emitted from the light source through the light guide plate.

When the edge-type backlight unit is used, an optical sheet is disposed between the light guide plate and the LCD panel and plays a role in diffusing and collecting light transmitted from the light guide plate. The optical sheet is formed of thin resins, and thus repeats expansion and contraction due to heat generated from the light source. Therefore, instead of being completely fixed, the optical sheet is generally fixed to the LCD panel by coupling a sheet guide unit formed on the optical sheet to a separation preventing protrusion arranged on a mold frame.

SUMMARY

A conventional separation preventing protrusion is fixed to the mold frame and the like, and thus it has been difficult to prevent defects caused by expansion and contraction of an optical sheet.

The invention is directed to a display device designed to prevent defects caused by expansion or contraction of the optical sheet.

According to an exemplary embodiment of the invention, a display device may include a light source configured to generate light, a light guide plate including a first surface which is configured to receive the light emitted from the light source, and a second surface which is configured to emit the light, an optical sheet disposed on the light guide plate and including a sheet body and a sheet guide unit protruding outwards from the sheet body, a mold frame including a guide mold on which the light guide plate and the sheet body are mounted, and a side-surface mold which is extended upwards from edges of the guide mold and in which a recess groove which accommodates the sheet guide unit is defined, and a protrusion body including a first end portion inserted in the mold frame and a second end portion coupled to the sheet guide unit, where an inserting groove in which the protrusion body is inserted is defined in the side-surface mold, and the protrusion body has a smaller width taken along a direction parallel to the side-surface mold compared to a width of the inserting groove.

In an exemplary embodiment, the protrusion body may further include a protrusion guide unit protruding from side surfaces of the protrusion body.

In an exemplary embodiment, a guide inserting groove may be further defined in the side-surface mold, and the protrusion guide unit may be inserted into the guide inserting groove.

In an exemplary embodiment, the protrusion guide unit may have a smaller width compared to a width of the guide inserting groove.

In an exemplary embodiment, at least one side of the inserting groove defined in the side-surface mold may be open.

In an exemplary embodiment, the protrusion body inserted in the inserting groove may be configured to rotate in a predetermined degree with respect to a direction perpendicular to the side-surface mold.

In an exemplary embodiment, the protrusion body may configured to rotate in a range of about 1 degree to about 30 degrees with respect to the direction perpendicular to the side-surface mold.

In an exemplary embodiment, the protrusion body may be configured to move in a predetermined range in a direction in parallel with the side-surface mold.

In an exemplary embodiment, the protrusion body may be configured to move in a range of about 0.1 millimeter (mm) to about 0.5 mm in the direction in parallel with the side-surface mold.

In an exemplary embodiment, edge portions of the second end portion of the protrusion body coupled to the sheet guide unit may be roundly provided.

In an exemplary embodiment, the display device may further include a fixing unit disposed on the recess groove in which the sheet guide unit is accommodated.

In an exemplary embodiment, the fixing unit may include a fixing body configured to fix the sheet guide unit and a fixing guide unit configured to fix the fixing body to the side-surface mold.

In an exemplary embodiment, the optical sheet may have a multi-layer laminated structure.

In an exemplary embodiment, the optical sheet may include at least one of a diffusion sheet, a prism sheet, and a protective sheet.

In an exemplary embodiment, the sheet body may have a quadrilateral shape in a plan view.

In an exemplary embodiment, the sheet guide unit may be disposed on at least one side among four sides of the sheet body.

In an exemplary embodiment, the sheet guide units may be disposed on a long side and a short side of the sheet body, respectively.

In an exemplary embodiment, the sheet guide units may be disposed on both long sides of the sheet body, respectively.

In an exemplary embodiment, the sheet guide units may be disposed on positions corresponding to each other.

According to exemplary embodiments of the invention, the display device is provided with a separation preventing protrusion detachably formed thereon so as to secure an additional movement margin, thereby preventing defects caused by expansion or contraction of the optical sheet.

The foregoing is illustrative only and is not intended to be in any way limiting. In addition to the illustrative exemplary embodiments, and features described above, further exemplary embodiments, and features will become apparent by reference to the drawings and the following detailed description.

BRIEF DESCRIPTION OF THE DRAWINGS

The above and other features and exemplary embodiments of the invention will be more clearly understood from the following detailed description taken in conjunction with the accompanying drawings, in which.

DETAILED DESCRIPTION

Figure 1:
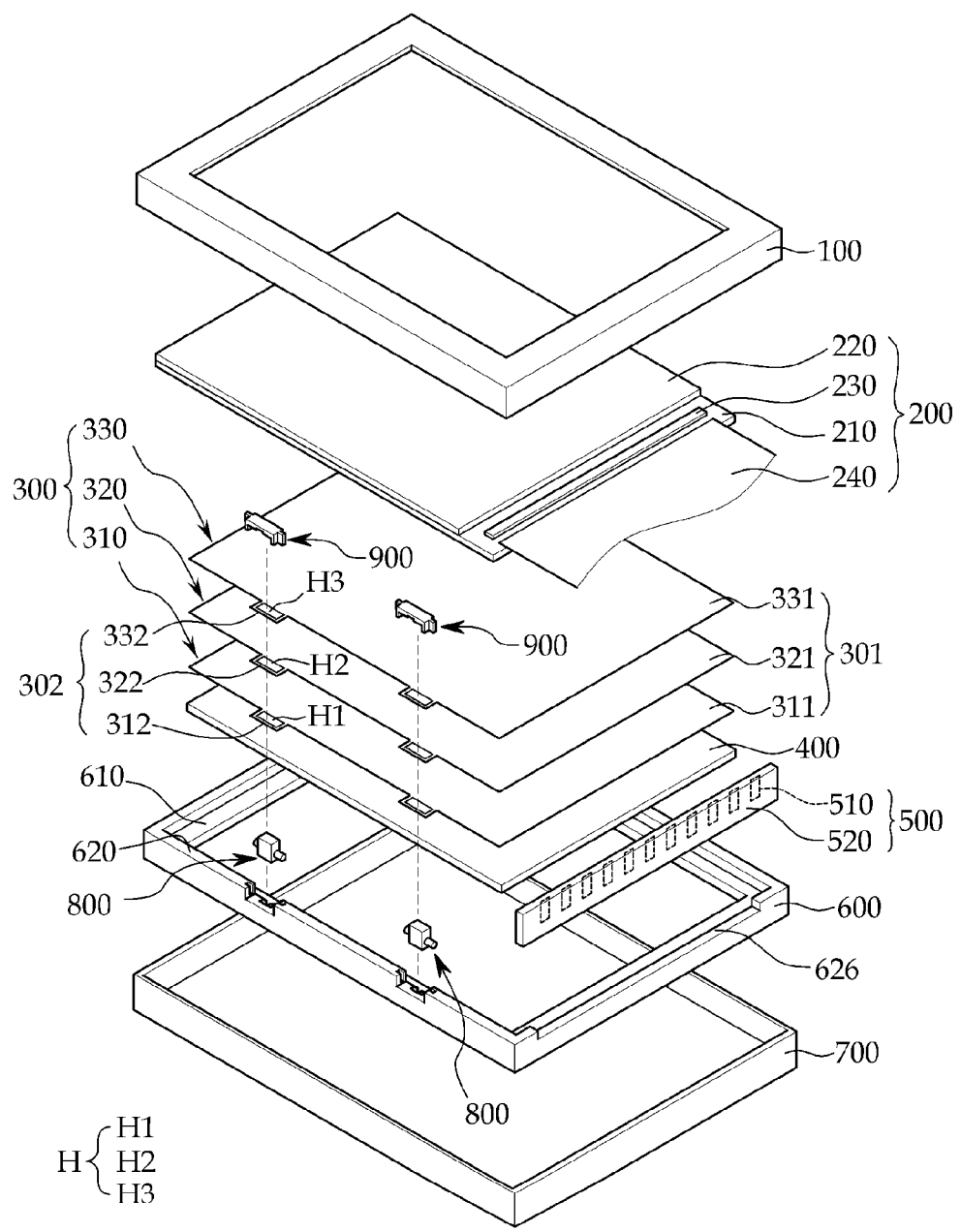
FIG. 1 is an exploded perspective view illustrating an exemplary embodiment of a display device according to the invention.

Hereinafter, exemplary embodiments of the invention will be described in more detail with reference to the accompanying drawings.

Although the invention can be modified in various manners and have several embodiments, specific embodiments are illustrated in the accompanying drawings and will be mainly described in the specification. However, the scope of the exemplary embodiments of the invention is not limited to the specific embodiments and should be construed as including all the changes, equivalents, and substitutions included in the spirit and scope of the invention.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example In an exemplary embodiment, if when the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Some of the parts which are not associated with the description may not be provided in order to specifically describe embodiments of the invention, and like reference numerals refer to like elements throughout the specification.

Figure 2:
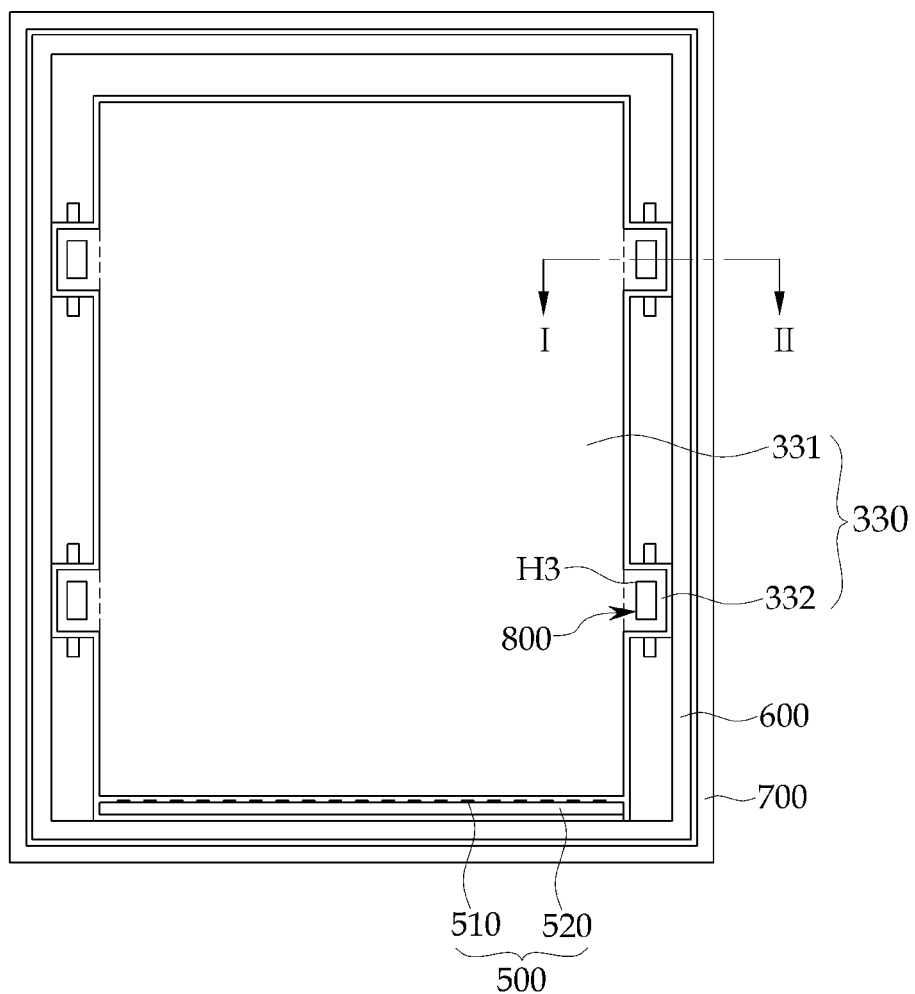
FIG. 2 is a plan view showing an exemplary embodiment of a backlight unit of the display device according to the invention.
Figure 3:
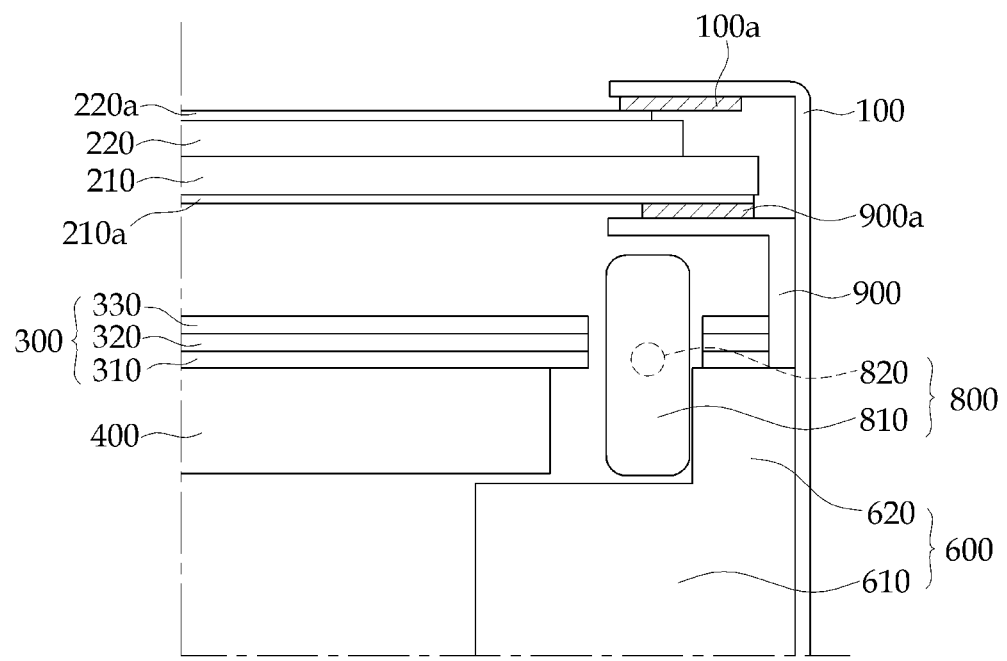
FIG. 3 is a cross-sectional view taken along line I-II of FIG. 2.

FIG. 1 is an exploded perspective view illustrating a display device according to an exemplary embodiment of the invention, FIG. 2 is a plan view showing a backlight unit of the display device according to an exemplary embodiment of the invention, and FIG. 3 is a cross-sectional view taken along line I-II of FIG. 2.

With reference to FIGS. 1 to 3, the display device according to an exemplary embodiment of the invention includes a top chassis 100, a liquid crystal display ("LCD") panel 200, an optical sheet 300, a light guide plate 400, a light source 500, a mold frame 600, and a bottom chassis 700. The mold frame 600 is coupled to the bottom chassis 700 and accommodates the LCD panel 200. Hereinafter, a backlight unit is to be understood as including the optical sheet 300, the light guide plate 400, the light source unit 500, the mold frame 600, and the bottom chassis 700.

The top chassis 100 is coupled to the mold frame 600 and the bottom chassis 700 so as to cover the LCD panel 200 mounted on the mold frame 600. An opening for exposing the LCD panel 200 at the center portion is defined in the top chassis 100. In an exemplary embodiment, the top chassis 100 may be coupled to the mold frame 600 and the bottom chassis 700 using an assembling member such as a hook and/or a screw.

The LCD panel 200 includes a first substrate 210, a second substrate 220, a liquid crystal layer (not illustrated), a driving chip 230, and a flexible printed circuit board ("PCB") 240.

In an exemplary embodiment, the first substrate 210 includes a plurality of pixel electrodes arranged in a matrix form, a thin film transistor ("TFT") configured to apply a driving voltage to the respective pixel electrodes, and various signal lines configured to drive the pixel electrodes and the TFT.

The second substrate 220 is disposed to face the first substrate 210 and includes a common electrode including a transparent conductive material and a color filter, for example. In an exemplary embodiment, the color filter may include red, green, and blue color filters, for example. However, the invention is not limited thereto, and the color filter may include various other color filters.

The liquid crystal layer (not illustrated) is interposed between the first substrate 210 and the second substrate 220 and rearranged in accordance with an electric field generated between the pixel electrode and the common electrode. Accordingly, the rearranged liquid crystal layer adjusts transmittance of light emitted from the backlight unit and the adjusted light passes through the color filter, such that an image is displayed.

The driving chip 230 may be disposed on the first substrate 210 and electrically connected to the various signal lines of the first substrate 210, thereby controlling the TFT in order to display an image.

The flexible PCB 240 overlaps a part of the first substrate 210 and is electrically connected to the first substrate 210. The flexible PCB 240 produces a control signal for controlling the driving chip 230 and controls the driving chip 230 according to the control signal. The flexible PCB 240 is coupled to a sill 626 defined in the mold frame 600, such that the flexible PCB 240 is guided.

With reference to FIG. 3, a bottom polarizing plate 210*a* may be disposed on a bottom surface of the first substrate 210 and a top polarizing plate 220*a* may be disposed on a top surface of the second substrate 220. The bottom polarizing plate 210*a* and the top polarizing plate 220*a* may have areas corresponding to the LCD panel 200. The bottom polarizing plate 210*a* only allows the light having a predetermined polarization direction among light emitted from the backlight unit to pass through the light having the predetermined polarization direction, and absorbs or blocks the other light having a polarization direction different from the predetermined polarization direction. The top polarizing plate 220*a* only allows the light having a predetermined polarization direction among light incident from the outside to pass through the light having the predetermined polarization direction, and absorbs or blocks the other light having a polarization direction different from the predetermined polarization direction.

In an exemplary embodiment, a first buffer member 100*a* may be further disposed between the top polarizing plate 220*a* and the top chassis 100 and, likewise, a second buffer member 900*a* may be further disposed between the bottom polarizing plate 210*a* and a fixing member 900. In an exemplary embodiment, the first buffer member 100*a* may be a sheet including an adhesive material and configured to fix the second substrate 200 to the top chassis 100. In an exemplary embodiment, the second buffer member 900*a* may be a sheet including an adhesive material and configured to fix the first substrate 210 to the fixing unit 900.

The optical sheet 300 is disposed on the light guide plate 400 and is configured to diffuse and/or collect light transmitted from the light guide plate 400. The optical sheet 300 may include a first optical sheet member 310, a second optical sheet member 320, and a third optical sheet member 330. In an exemplary embodiment, the first optical sheet member 310 may be a diffusion sheet, the second optical sheet member 320 may be a prism sheet, and the third optical sheet member 330 may be a protective sheet, for example. In FIG. 1, the display device according to an exemplary embodiment of the invention is depicted as including the optical sheet 300 having three optical sheet members 310, 320 and 330, but the invention is not limited thereto, and the optical sheet 300 may include two, four, or more optical sheet members in another exemplary embodiment.

The diffusion sheet is configured to disperse light incident from the light guide plate 400 so as to prevent the light from being partly concentrated.

In an exemplary embodiment, the prism sheet may include prisms, which have a triangular cross-section and are aligned in a predetermined arrangement, for example, on one surface thereof. The prism sheet may be disposed on the diffusion sheet and may play a role in collecting light diffused from the diffusion sheet in a direction perpendicular to the LCD panel 200.

The protective sheet may be disposed on the prism sheet and may play a role in protecting a surface of the prism sheet and diffuse light to achieve a uniform light distribution.

Each of the optical sheet members 310, 320 and 330 of the optical sheet 300 having a multi-layer laminated structure includes a sheet body 301 and a sheet guide unit 302 protruding outwards from the sheet body 301. A locking hole H may be defined in the sheet guide unit 302.

In other words, the optical sheet members 310, 320, and 330 of the optical sheet 300 respectively include the sheet body members 311, 321, and 331 of the sheet body 301 and the sheet guide unit members 312, 322, and 332 of the sheet guide unit 302 on which locking hole portions H1, H2, and H3 of the locking hole H are respectively defined.

With reference to FIGS. 1 and 2, the sheet body 301 is disposed on the light guide plate 400 and is guided by a guide mold 610 of the mold frame 600. In an exemplary embodiment, the sheet body 301 has a quadrilateral shape having substantially four sides in a plan view.

The sheet guide unit 302 protrudes outwards from the sheet body 301. In this case, the sheet guide unit 302 may be disposed on at least one side among four sides of the sheet body 301.

According to an exemplary embodiment of the invention, the sheet guide unit 302 protrudes outwards from both long sides of the sheet body 301. In FIGS. 1 and 2, it is described that two sheet guide units 302 are disposed at the respective long sides of the sheet body 301. However, embodiments of the invention are not limited thereto, and thus two or more sheet guide units may be disposed at the respective long sides.

In an exemplary embodiment of the invention, two to five sheet guide units 302 may be disposed at the respective long sides of the sheet body 301. In this case, it is desirable that the respective sheet guide units 302 disposed at the respective long sides are disposed to face each other.

According to another embodiment of the invention, the sheet guide units 302 may be disposed at a long side and a short side of the sheet body 301, respectively. In an exemplary embodiment, two to five sheet guide units 302 may be disposed at the respective long sides of the sheet body 301 and one to three sheet guide units 302 may be disposed at the respective short sides of the sheet body 301. In another exemplary embodiment, two to five sheet guide units 302 may be disposed at a long side of the sheet body 301 and one to three sheet guide units 302 may be disposed at a short side of the sheet body 301.

The locking hole H may be defined in the sheet guide unit 302. The locking hole H is coupled to a protrusion 800 that is coupled to the mold frame 600, thereby preventing movement of the sheet body 301.

The light guide plate 400 uniformly supplies light provided from the light source unit 500 to the LCD panel 200. The light guide plate 400 is disposed close to the light source unit 500 and accommodated in the bottom chassis 700. In an exemplary embodiment, the light guide plate 400 may be provided in a form of, for example, a quadrilateral plate like the LCD panel 200. However, embodiments of the invention are not limited thereto, and thus in a case where a light emitting diode ("LED") chip is used as a light source, the light guide plate 400 may have various forms which includes protrusions, or the like, and in which predetermined grooves, or the like, are defined depending on the position of the light source.

In the illustrated exemplary embodiment, the light guide plate 400 is described as a plate for ease of description, but it may be provided in a form of a sheet or a film to achieve slimness of display devices, for example. That is, the light guide plate 400 is to be understood as having a concept that includes not only a plate but also a film for guiding light.

In an exemplary embodiment, the light guide plate 400 may include a light-transmissive material such as, for example, acrylic resins, such as polymethylmethacrylate ("PMMA"), or polycarbonate ("PC") so as to guide light efficiently.

Although not illustrated in FIG. 1, a reflective sheet may be disposed between the light guide plate 400 and the bottom chassis 700, so that light emitted downwards from the light guide plate 400 is reflected toward the LCD panel 200, thereby increasing light efficiency. In an exemplary embodiment, the reflective sheet may include, for example, polyethylene terephthalate ("PET") so as to achieve reflectance properties. In an exemplary embodiment, one surface of the reflective sheet may be coated with a diffusion layer including, for example, titanium dioxide. In an exemplary embodiment, the reflective sheet may include a material including metal such as silver (Ag).

The light source unit 500 includes a light source 510 and a circuit substrate 520 on which the light source 510 is disposed. The light source 510 may be disposed at an edge portion or on a light incident surface of the light guide plate 400. That is, the light source 510 may emit light toward the edge portion or the light incident surface of the light guide plate 400. The light source 510 may include at least one LED chip (not illustrated) and a package (not illustrated) for accommodating the LED chip. In an exemplary embodiment, the LED chip (not illustrated) may include a gallium nitride (GaN)-based LED chip that emits blue light, for example.

In an exemplary embodiment, the circuit substrate 520 may be a PCB or a metal PCB, for example.

The light source unit 500 may be disposed on one side surface, both side surfaces, or all four side surfaces of the light guide plate 400, in consideration of the size and the luminance uniformity and the like of the LCD panel 200. That is, the light source unit 500 may be disposed on at least one edge portion of the light guide plate 400.

Although not illustrated in FIG. 1, a wavelength converting unit (not illustrated) may be disposed between the light guide plate 400 and the light source unit 500. The wavelength converting unit (not illustrated) may include a substance that changes a wavelength of light. In an exemplary embodiment, the wavelength converting unit may change a wavelength of blue light emitted from a blue LED light source, for example, so that the blue light is converted to white light.

Further, although not illustrated in FIG. 1, a heat dissipating member (not illustrated) may be disposed between the light source unit 500 and the bottom chassis 700. The heat dissipating member may release heat generated from the light source unit 500 to the outside. In a case where the light source unit 500 is disposed on one side of the bottom chassis 700 having a bar or a line form, a metal frame having a bar or a line form may be disposed as the heat dissipating member. Accordingly, the heat dissipating member may have various forms depending on the form of the light source unit 500.

The mold frame 600 includes a guide mold 610 configured to accommodate the light guide plate 400 and a side-surface mold 620 extended upwards from edges of the guide mold 610.

A recess groove for accommodating the sheet guide unit 302 is defined in the side-surface mold 620. Further, an insertion groove for accommodating a protrusion 800 is defined in the side-surface mold 620. A configuration of the side-surface mold 620 on which the recess groove and the insertion groove are defined will be described below with reference to FIGS. 4 to 7 in detail.

The bottom chassis 700 accommodates the light guide plate 400, the light source unit 500, and the mold frame 600. In an exemplary embodiment, the bottom chassis 700 may include a metal material having rigidity properties such as stainless steel or a material having good heat dissipation properties such as aluminum or aluminum alloys. The bottom chassis 700 is configured to maintain a framework of the display device and protect a variety of components accommodated therein.

FIGS. 4 to 7 are partially enlarged perspective views for explaining a configuration of the mold frame 600, the protrusion 800, and the fixing unit 900 according to an exemplary embodiment of the invention.

Figure 4:
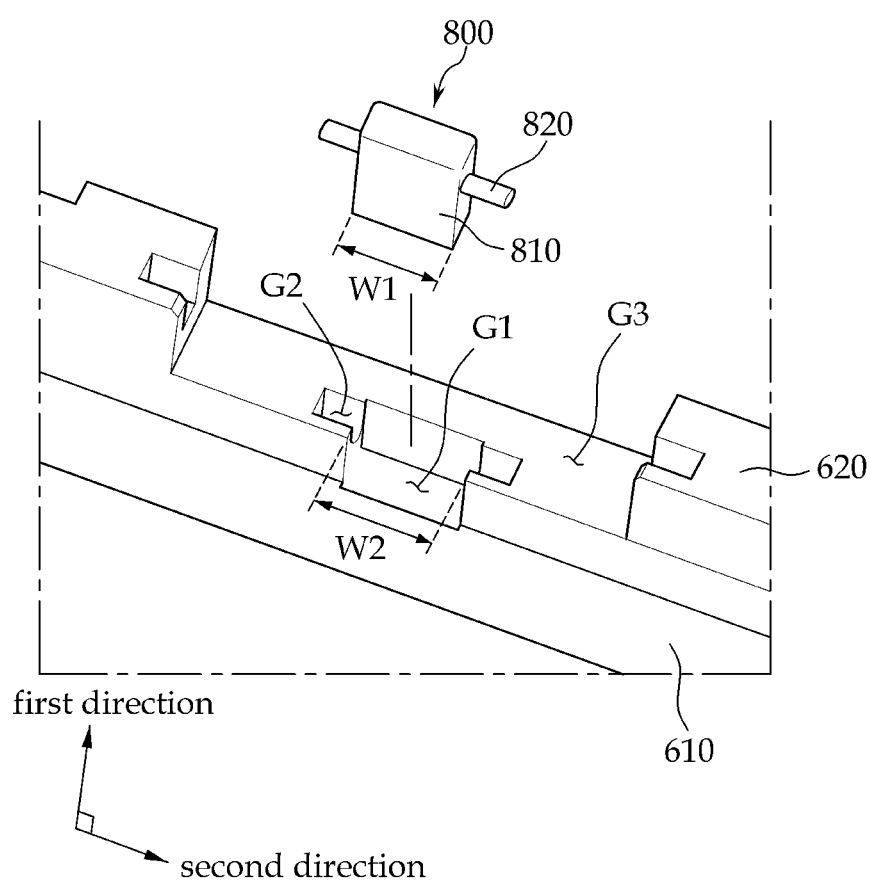
FIGS. 4 to 7 are partially enlarged perspective views for explaining an exemplary embodiment of a configuration of a mold frame, a protrusion, and a fixing unit according to the invention.
Figure 5:
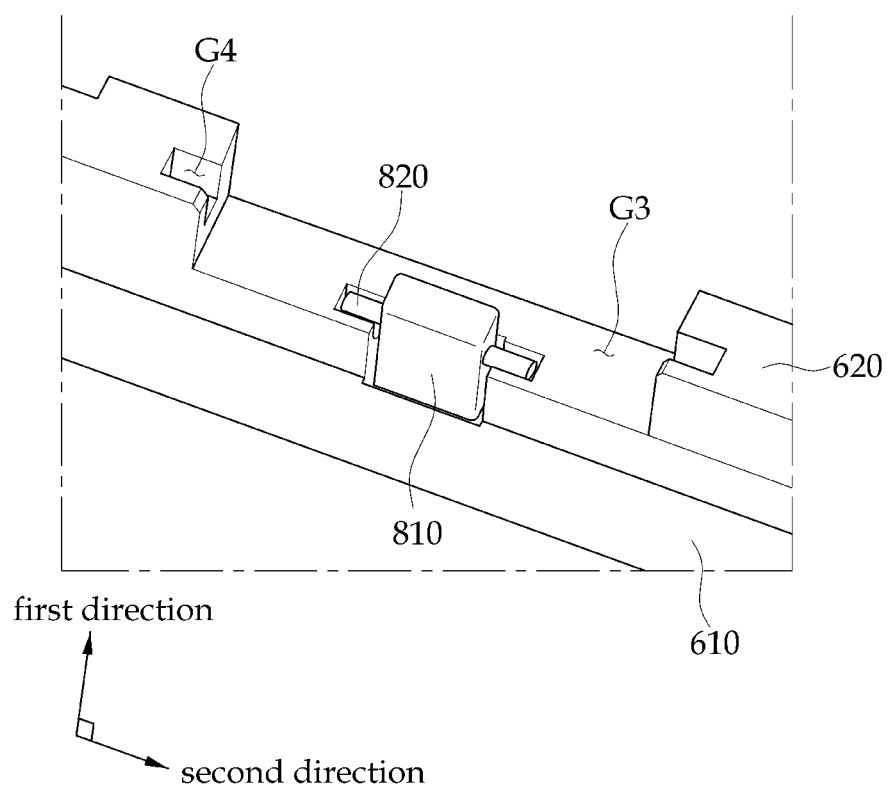

With reference to FIGS. 4 and 5, the mold frame 600 includes a guide mold 610 configured to accommodate the light guide plate 400 and the side-surface mold 620 extended upwards from the edges of the guide mold 610. A recess groove G3 may be defined in the side-surface mold 620 at an area corresponding to the sheet guide unit. Further, an inserting groove G1 may be defined in the side-surface mold 620 where the protrusion body described below will be inserted.

The protrusion 800 includes a protrusion body 810 and a protrusion guide unit 820 protruding from side surfaces of the protrusion body 810. In FIG. 4, the protrusion body 810 is depicted as having a quadrilateral cross-section, for example, but is not limited thereto. In other exemplary embodiments, the protrusion body 810 may have various other shapes such as an oval or a semi-circular cross-section. The lower portion of the protrusion body 810 is inserted into the inserting groove G1 and the upper portion of the protrusion body 810 may be coupled to the sheet guide unit. Upper edge portions of the protrusion body 810 may be roundly provided in order to prevent the sheet guide unit from being torn when coupled to the protrusion body 810.

The protrusion body 810 has a smaller width taken along a second direction compared to that of the inserting groove G1. Because the width of the protrusion body 810 is smaller than that of the inserting groove G1, the protrusion body 810 may move within a predetermined range in the second direction in the inserting groove G1.

In the illustrated exemplary embodiment, a width W1 in the second direction of the protrusion body 810 may be smaller compared to a width W2 in the second direction of the inserting groove G1. Therefore, the protrusion body 810 may move within a predetermined range W2-W1 in a direction (i.e., the second direction) in parallel with the side-surface mold 620 in the inserting groove G1. According to an exemplary embodiment of the invention, the protrusion body 810 may move in a range of about 0.1 millimeter (mm) to about 0.5 mm in the second direction in the inserting groove G1, for example.

In addition, the side-surface mold 620 accommodates the protrusion guide unit 820, and a guide inserting groove G2 connected to the inserting groove G1 may be defined in the side-surface mold 620. That is, the protrusion body 810 and the protrusion guide unit 820 may be inserted in the inserting groove G1 and the guide inserting groove G2, respectively, in a top-down method.

The protrusion guide unit 820 has a smaller width compared to the guide inserting groove G2. Because the width of the protrusion guide unit 820 is smaller than that of the guide inserting groove G2, the protrusion guide unit 820 may move within a predetermined range in a direction (i.e., the second direction) in parallel with the side-surface mold 620 in the guide inserting groove G2. According to an exemplary embodiment of the invention, the protrusion guide unit 820 may move in a range of about 0.1 mm to about 0.5 mm in the second direction in the guide inserting groove G2, for example.

The inserting groove G1 is defined in the side-surface mold 620 and accommodates the protrusion body 810. Except for a side of the inserting groove G1 where the protrusion body 810 is inserted, at least one side among surfaces of the side-surface mold 620 may be open to provide mobility to the protrusion body 810.

According to an exemplary embodiment of the invention, a side of the side-surface mold 620 that is in contact with the guide mold 610 may be open. By using the opening defined in one side of the inserting groove G1, the protrusion body 810 may rotate in a range of about 1 degree to about 30 degrees with respect to a direction (i.e., a first direction) perpendicular to the side-surface mold 620.

Figure 6:
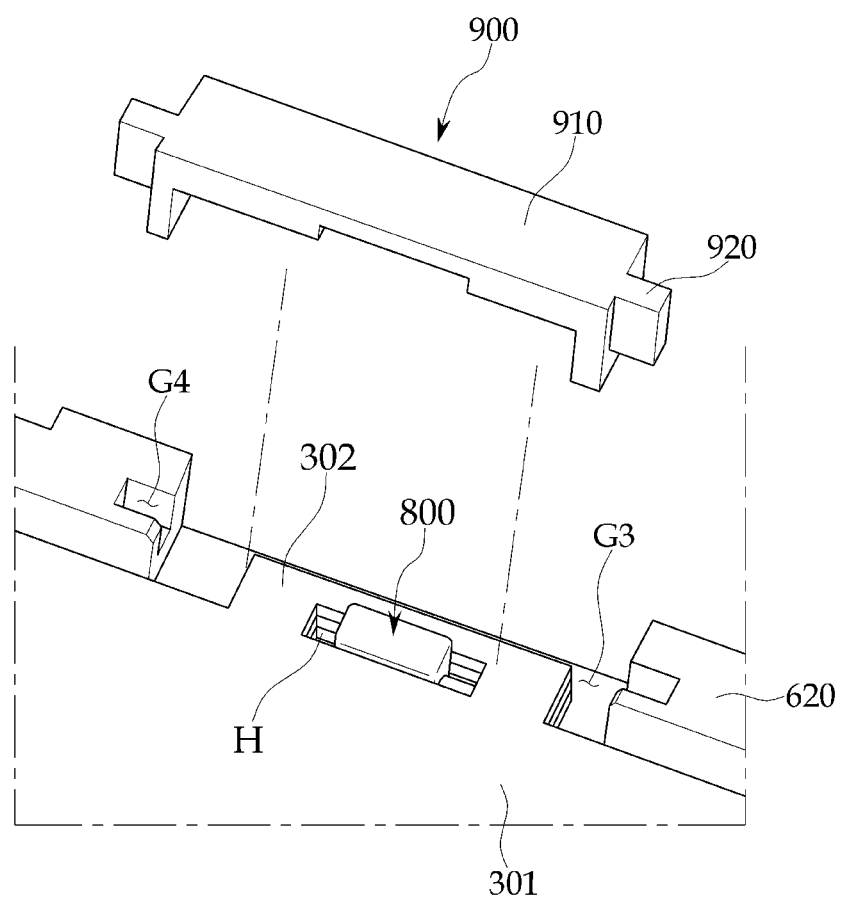
Figure 7:
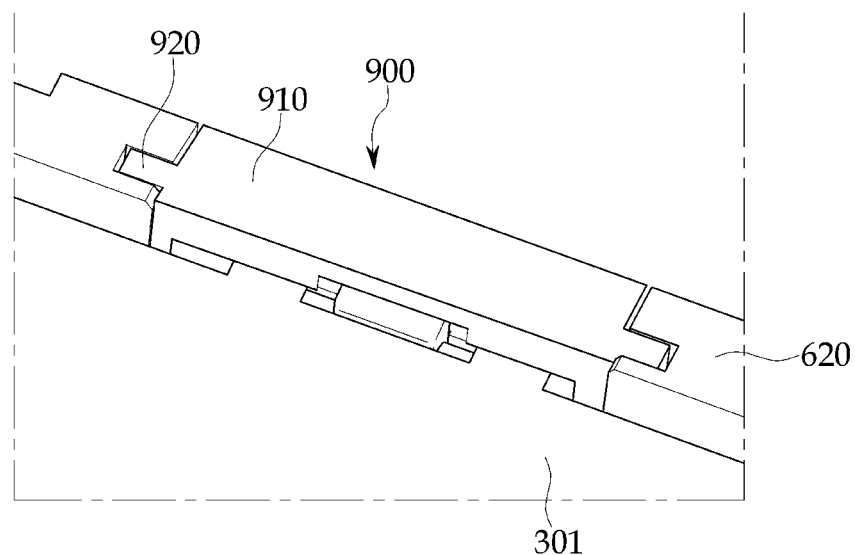

With reference to FIGS. 6 and 7, the protrusion body 810 and the protrusion guide unit 820 (refer to FIG. 5) are respectively inserted in the inserting groove G1 and the guide inserting groove G2 (refer to FIG. 5), and then the sheet guide unit 302 is disposed on the recess groove G3. In this case, the locking hole H defined in the sheet guide unit 302 and the protrusion body 810 are coupled to each other. Then, the recess groove G3 where the sheet guide unit 302 is disposed and the fixing unit 900 may be coupled to each other.

The fixing unit 900 includes a fixing body 910 and a fixing guide unit 920 that protrudes from side surfaces of the fixing body 910. The fixing body 910 is inserted into the recess groove G3 and fixes the sheet guide unit 302. On the bottom surface of the fixing body 910, a groove may be defined in order to accommodate the sheet guide unit 302 and the protrusion body 810 (refer to FIG. 5). It is desirable that the groove defined in the bottom surface of the fixing body 910 has a width that allows the sheet guide unit 302 and the protrusion body 810 to move therein.

The fixing guide unit 920 is coupled to a fixing guide groove G4 defined in the side-surface mold 620, such that the fixing unit 900 is fixed to the mold frame 600 (refer to FIGS. 1 to 3).

Figure 8:
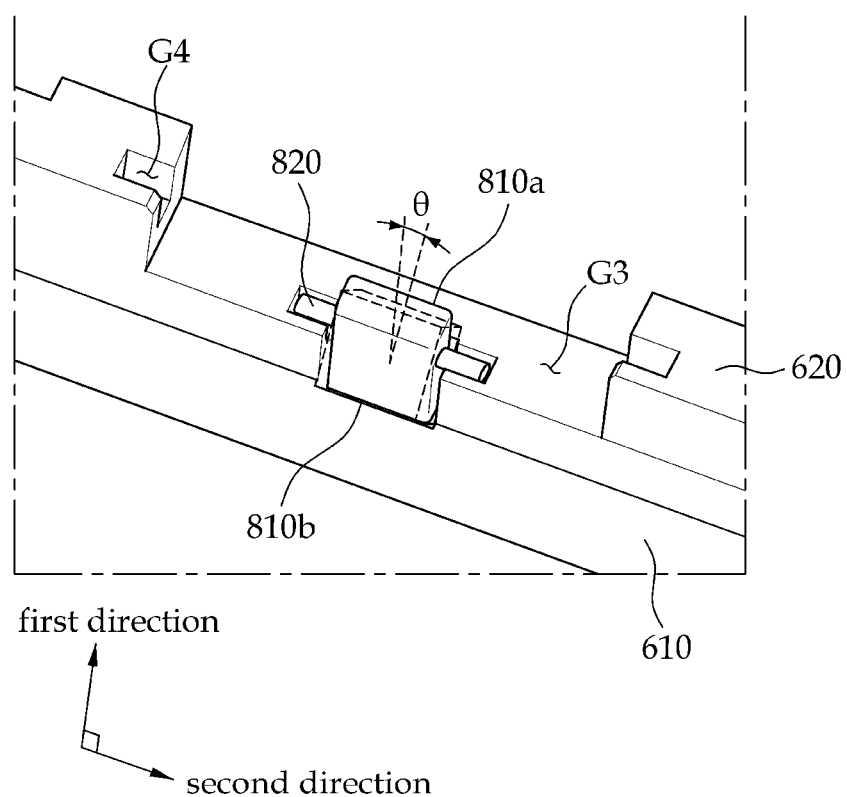
FIGS. 8 to 10 are a perspective view and cross-sectional views for explaining an exemplary embodiment of a possible range of movement of a protrusion according to the invention, respectively.
Figure 9:
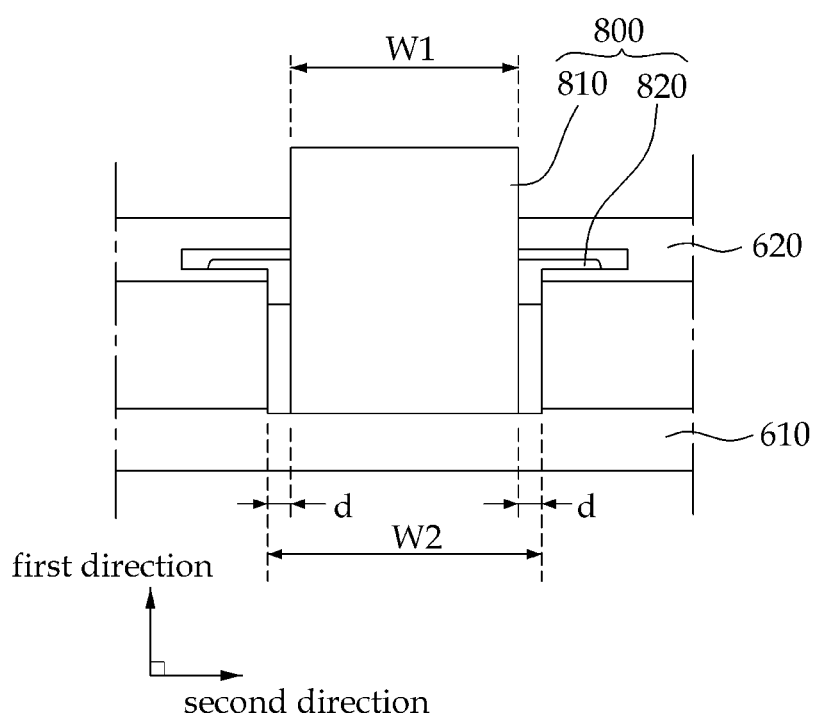
Figure 10:
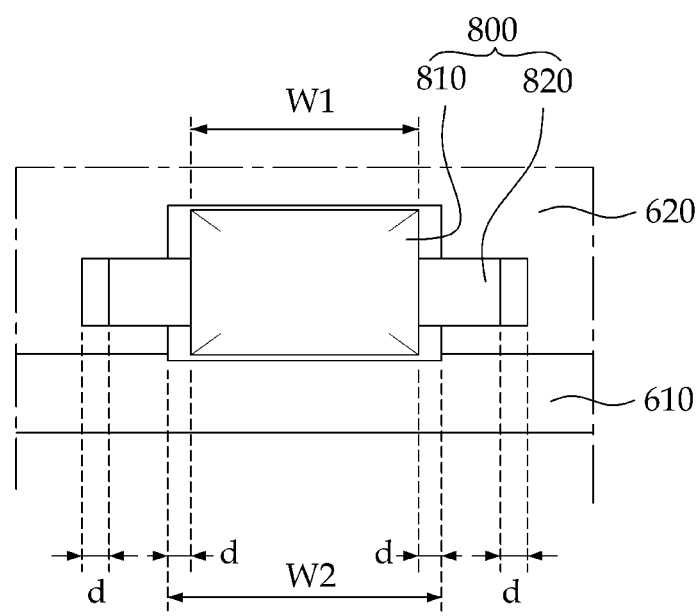

FIGS. 8 to 10 are a perspective view and cross-sectional views for explaining a possible range of movement of a protrusion according to an exemplary embodiment of the invention.

With reference to FIG. 8, one side of the inserting groove may be open in order to provide mobility to the protrusion body. Using the opening defined in one side of the inserting groove, an upper portion 810a of the protrusion body may move toward outside of the side-surface mold 620 and a lower portion 810b of the protrusion body may move toward inside of the side-surface mold 620. That is, the protrusion body may move within a predetermined degree $\theta$ with respect to a direction (i.e., the first direction) perpendicular to the side-surface mold 620. According to an exemplary embodiment of the invention, the protrusion body 810 may rotate in a range of about 1 degree to about 30 degrees with respect to a direction (i.e., the first direction) perpendicular to the side-surface mold 620.

With reference to FIGS. 9 and 10, the width W1 of the protrusion body 810 in the second direction may be smaller than the width W2 of the inserting groove in the second direction. Therefore, in the inserting groove, the protrusion body 810 may move within a predetermined range 2d which equals to a difference between the widths W2 and W1 (i.e., 2d=W2−W1) in a direction (i.e., the second direction) in parallel with the side-surface mold 620.

Likewise, the width of the protrusion guide unit 820 is smaller than that of the guide inserting groove G2. Because the protrusion guide unit 820 has a smaller width compared to the guide inserting groove G2, the protrusion guide unit 820 may move within a predetermined range in a direction (i.e., the second direction) in parallel with the side-surface mold 620 in the guide inserting groove G2.

According to an exemplary embodiment of the invention, the protrusion body 810 may move in a range of about 0.1 mm to about 0.5 mm in the second direction in the inserting groove. Likewise, the protrusion guide unit 820 may move in a range of about 0.1 mm to about 0.5 mm in the second direction in the inserting groove.

Accordingly, the display device according to an exemplary embodiment of the invention has a detachable protrusion configured to prevent separation of the optical sheet and allows the optical sheet to move in a predetermined range, thereby preventing defects caused by expansion and contraction of the optical sheet.

From the foregoing, it will be appreciated that various embodiments in accordance with the invention have been described herein for purposes of illustration, and that various modifications may be made without departing from the scope and spirit of the teachings. Accordingly, the various embodiments disclosed herein are not intended to be limiting of the true scope and spirit of the teachings.

What is claimed is:
1. A display device comprising:
a light source configured to generate light;
a light guide plate including:
   a first surface which is configured to receive the light emitted from the light source; and
   a second surface which is configured to emit the light;

an optical sheet disposed on the light guide plate and comprising a sheet body, and a sheet guide unit protruding outwards from the sheet body;

a mold frame comprising:
- a guide mold on which the light guide plate and the sheet body are mounted; and
- a side-surface mold which is extended upwards from edges of the guide mold and in which a recess groove which accommodates the sheet guide unit is defined; and a protrusion body comprising:
- a first end portion inserted in the mold frame; and
- a second end portion coupled to the sheet guide unit, wherein an inserting groove in which the protrusion body is inserted is defined in the side-surface mold, and the protrusion body has a smaller width taken along a direction parallel to the side-surface mold compared to a width of the inserting groove.

2. The display device of claim 1, wherein the protrusion body further comprises a protrusion guide unit protruding from side surfaces of the protrusion body.

3. The display device of claim 2, wherein a guide inserting groove connected to the inserting groove is further defined in the side-surface mold, and the protrusion guide unit is inserted into the guide inserting groove.

4. The display device of claim 3, wherein the protrusion guide unit has a smaller width compared to a width of the guide inserting groove.

5. The display device of claim 1, wherein at least one side of the inserting groove defined in the side-surface mold is open.

6. The display device of claim 1, wherein the protrusion body inserted in the inserting groove is configured to rotate in a predetermined degree with respect to a direction perpendicular to the side-surface mold.

7. The display device of claim 6, wherein the protrusion body is configured to rotate in a range of about 1 degree to about 30 degrees with respect to the direction perpendicular to the side-surface mold.

8. The display device of claim 1, wherein the protrusion body is configured to move in a predetermined range in the direction in parallel with the side-surface mold.

9. The display device of claim 8, wherein the protrusion body is configured to move in a range of about 0.1 millimeter to 0.5 millimeter in the direction in parallel with the side-surface mold.

10. The display device of claim 1, wherein edge portions of the second end portion of the protrusion body coupled to the sheet guide unit are roundly provided.

11. The display device of claim 1, further comprising a fixing unit disposed on the recess groove in which the sheet guide unit is accommodated.

12. The display device of claim 11, wherein the fixing unit comprises a fixing body configured to fix the sheet guide unit and a fixing guide unit configured to fix the fixing body to the side-surface mold.

13. The display device of claim 1, wherein the optical sheet has a multi-layer laminated structure.

14. The display device of claim 13, wherein the optical sheet comprises at least one of a diffusion sheet, a prism sheet, and a protective sheet.

15. The display device of claim 1, wherein the sheet body has a quadrilateral shape in a plan view.

16. The display device of claim 15, wherein the sheet guide unit is disposed on at least one side among four sides of the sheet body.

17. The display device of claim 16, wherein the sheet guide units are disposed on a long side and a short side of the sheet body, respectively.

18. The display device of claim 16, wherein the sheet guide units are disposed on both long sides of the sheet body, respectively.

19. The display device of claim 18, wherein the sheet guide units are disposed on positions corresponding to each other.

* * * * *